United States Patent
Worpell et al.

(10) Patent No.: US 6,488,113 B1
(45) Date of Patent: Dec. 3, 2002

(54) DISABLE CONTROL FOR FOUR WHEEL STEER VEHICLE

(75) Inventors: David Robert Worpell, Clarkston, MI (US); David Merglewski, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/875,302

(22) Filed: Jun. 7, 2001

(51) Int. Cl.[7] ................................................ B62D 6/00
(52) U.S. Cl. ........................ 180/410; 180/411; 701/41
(58) Field of Search .................................. 180/410, 411, 180/412, 416, 443, 445, 446; 701/41, 43

(56) References Cited

U.S. PATENT DOCUMENTS 5,508,921 A * 4/1996 Chikuma et al. ............ 180/410
5,921,335 A * 7/1999 Straetker .................... 180/6.44
5,948,029 A * 9/1999 Straetker .................... 180/6.44

* cited by examiner

Primary Examiner—F. Zeender
(74) Attorney, Agent, or Firm—Laura C. Hargitt

(57) ABSTRACT

A disable control system for a four-wheel steer vehicle disables rear-wheel steer capability when desired. The rear-wheel steer mechanism is responsive to, and at a fractional proportion of, the front wheel steering as a function of vehicle speed. The disable function operates in the dual, i.e. both front and rear steering mode only. The vehicle also includes a normal user selectable single steering mode, wherein only the front wheels are capable of being steered. Upon disablement of the rear wheel steering response, the control system automatically switches to the single steering mode, thus returning the rear wheels to a centered, zero steer angle, position.

6 Claims, 2 Drawing Sheets

DISABLE CONTROL FOR FOUR WHEEL STEER VEHICLE

TECHNICAL FIELD

This invention relates to control of rear wheel steering in a four-wheel steer vehicle, and in particular to a method for automatically disabling rear wheel steering upon certain limited conditions.

BACKGROUND OF THE INVENTION

In four-wheel steering capable vehicles, an electronically controlled rear wheel steering system typically permits the rear wheels to be steered a proportional amount of front wheel steering in response to front wheel steering inputs. Normally rear wheel steering is strictly a user-selectable function permitting switching between four-wheel steering and front-wheel steering-only modes. One notable difference between four-wheel steer trucks and four-wheel steer cars is the use of a wider track width for rear wheels in some of the larger pickup trucks. Thus in a given truck, the rear track can be considerably wider than the front track width. Track width is herein defined as the measured distance between the outside of the left tire to the outside of the right tire on a given axle.

The use of larger track widths has given rise to the exacerbation of a problem with four-wheel steerable vehicles when used in automatic car wash assemblies. When the four-wheel steering mode is active and front steering inputs are induced via car wash rails, the rear wheels are indirectly steered for proper tracking between the car wash rails. When this occurs, particularly in the case of larger rear track widths, it has been noted that the rear tires of the vehicle have greater tendency to scrub, or even to occasionally become bound, against the rails of the car wash mechanism, temporarily disrupting car wash operations.

Unfortunately, it is not always feasible to rely upon the vehicle user to remember to deactivate the four-wheel steering mode to avoid the issue.

SUMMARY OF THE INVENTION

This invention provides an algorithm control solution to avoid the binding of four-wheel steerable vehicle wheels against the rails of a car wash mechanism, irrespective of active steering mode. Upon selection of a neutral gear, with four-wheel steering enabled, and at low vehicle speeds, the four-wheel steerable system will automatically switch into a two-wheel steering, or front steering only, mode. An algorithm control unit will disable the rear-wheel steering function, returning the rear wheels to their centered, non-angled, positions to eliminate binding of the rear wheels against the car wash rails as the vehicle is being pulled forward in a car wash assembly.

Since rear steering capability of a four-wheel steer vehicle is generally user-selectable between the modes of two-wheel steering and four-wheel steering, the algorithm control unit of the present invention provides that in the event that the vehicle enters a car wash in the four-wheel steering mode, the four-wheel mode will be automatically switched to the two-wheel mode, thus avoiding potential binding of the rear wheels. The invention also contemplates a solution to an increased likelihood of a wide rear track vehicle having its rear wheels bind between car wash rails, during the condition that the rear wheels of such vehicle are being steered; i.e. in a four-wheel steer mode.

In one preferred embodiment of the present invention, the vehicle will automatically enter into the two-wheel steering mode whenever the neutral gear of the transmission is selected, and the vehicle speed is less than five miles per hour, conditions likely to be encountered while a vehicle is being pulled through an automatic car wash assembly. dr

DESCRIPTION OF THE PREFERRED EMBODIMENT

Figure 2:
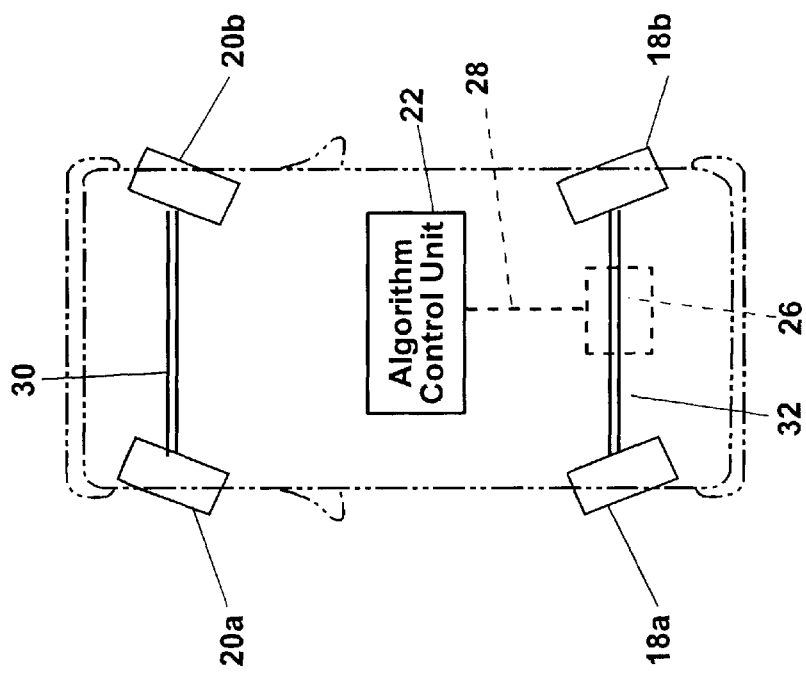
FIG. 2 is a schematic diagram of the four-wheel steerable system showing the master algorithm control unit for determining relative rear wheel positions.
Figure 1:
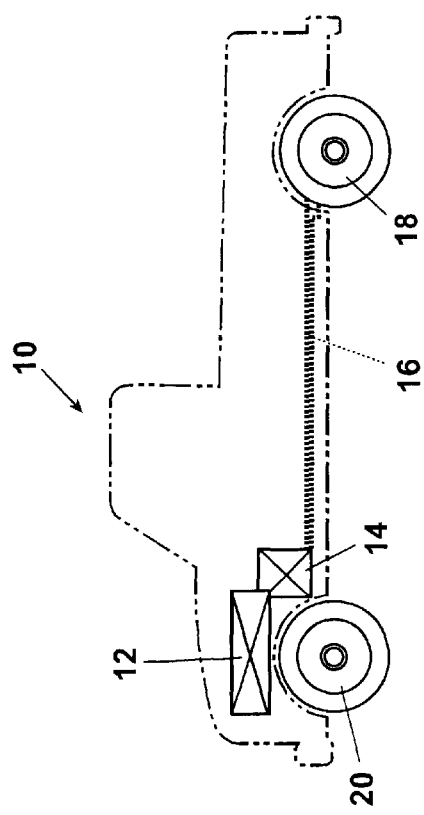
FIG. 1 is an elevation view of a four-wheel steerable truck vehicle of the type that includes a set of rear wheels having a wider track than the track of the front wheels of same vehicle.

Referring to FIGS. 1 and 2, a vehicle 10 is of a four-wheel steerable design. The vehicle includes a prime mover or motor 12, a transmission 14 coupled to the motor at one end and engageable with a drive shaft 16 at its opposite end. The drive shaft 16 operates rear driving wheels 18 through a rear drive axle 32.

Referring now particularly to FIG. 2, a set of front wheels 20 (shown as left and right wheels 20a and 20b) of vehicle 10 is normally full-time steering capable in both user selectable steering modes described herein. Indeed, the front wheel steering capability is fully mechanical, wherein inputs from the vehicle's steering hand wheel are carried out by way of recirculating ball or rack and pinion units as will be appreciated by those skilled in the art. In the embodiment described, however, rear wheels 18 (again, left and right wheels 18a and 18b) are selectably part-time steerable, and such selectability is effective for switching between two-wheel and four-wheel steering modes by the operator of the vehicle.

An electronically responsive master algorithm control unit 22 is employed to steer the rear wheels by means of rear wheel sub-control unit or motor 26. In one preferred embodiment, the master control unit 22 reads input data from a separate front wheel steering sensor module (not shown) fixed to the vehicle steering column (not shown). The module calculates an appropriate proportion of rear wheel steering based on the front wheel steering wheel input data. The master control unit 22 in turn provides output to the motor 26, which is connected to the master control unit by means of an electrical connector 28, as shown.

Figure 3:
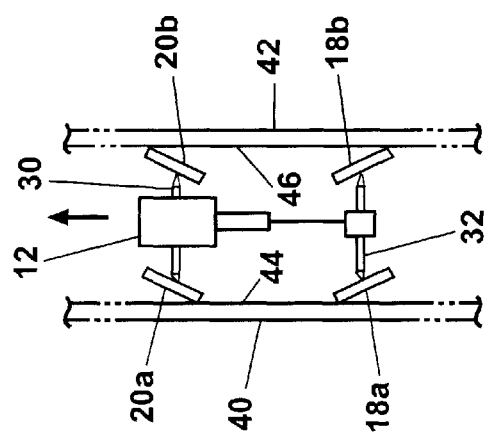
FIG. 3 is a schematic diagram of the system of FIG. 2, shown representing a vehicle positioned between parallel rails of a car wash assembly.

Referring now to FIG. 3, it will be noted that the wheels of the vehicle are represented as being trapped between and in effect, controlled by parallel rails of an automatic car wash assembly, as the vehicle 10 is being pulled forward in direction of the arrow. Thus, front wheels 20 which are steerable on axle 30, and rear wheels 18 which are steerable on axle 32, in their free wheeling states are indirectly steered by left and right car wash rails 40 and 42, respectively. It will be noted that the inside edge of the left car rail 40 defines a two dimensional tire engaging barrier 44, which operates to restrict steerability, and hence steer angle, of the left side vehicle wheels 20a and 18a as shown in FIG. 3.

Commensurately, the tire-engaging barrier 46 of the right car wash rail 42 serves the same function with respect to the right side tires 20b and 18b. Although only left and right rails 40 and 42 are depicted in FIG. 3, a center rail (not shown) is also often employed in some car wash assemblies. Thus, this invention facilitates avoidance of tire scrubbing action with respect to any such center rail, in addition to the avoidance of such action with respect to conventional outside left and right rails 40 and 42.

Figure 4:
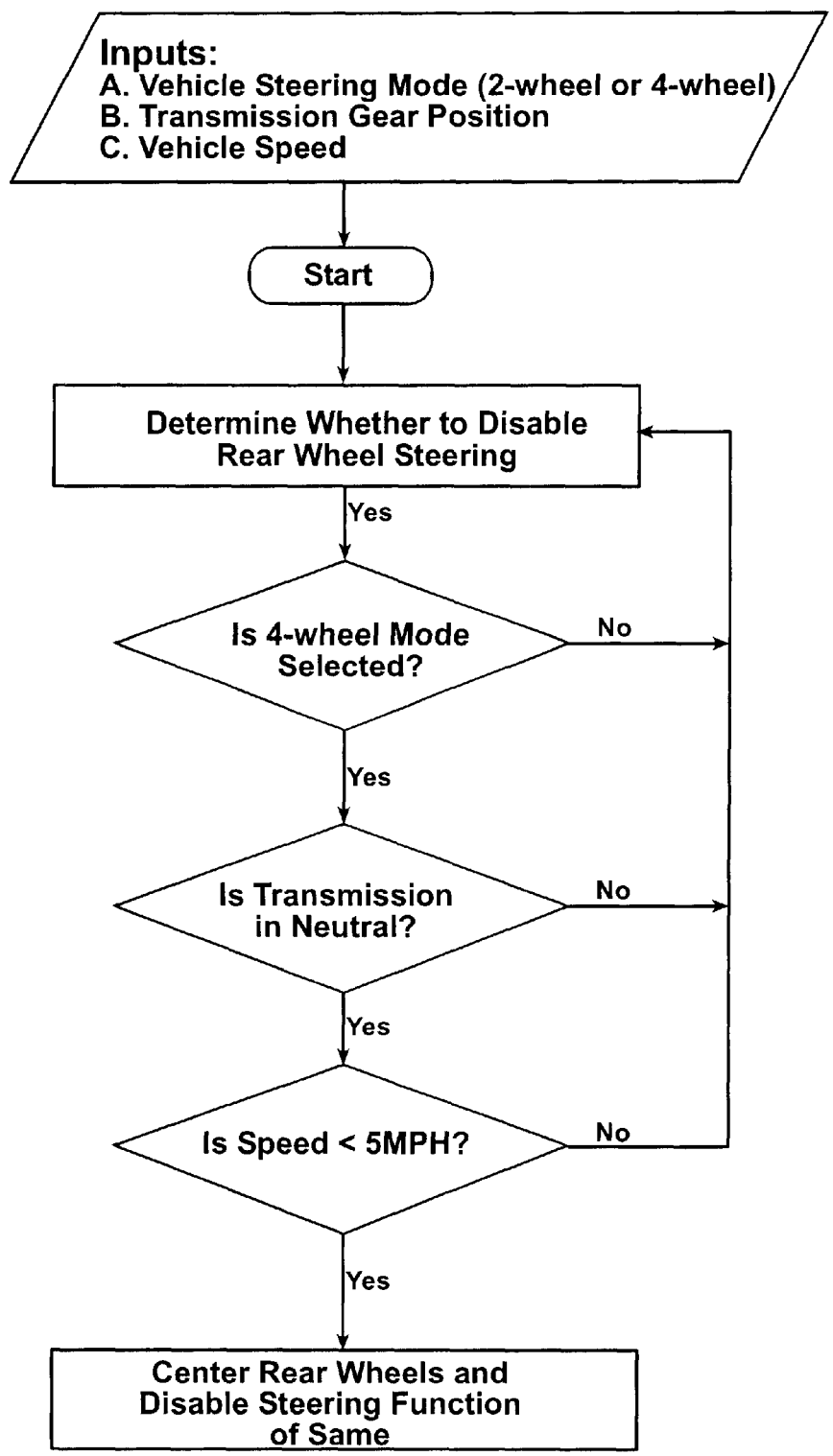
FIG. 4 displays an algorithm control sequence for disabling rear wheel steering in a four-wheel steer vehicle.

It will be appreciated by those skilled in the art that several embodiments of on-board computer software algorithms may be suitable for the purpose of electronically and selectively disabling the described rear wheel steering function. For example, such disablement may be effected at the rear wheel sub control unit 26, or alternatively the disablement may be effected at the main or master control unit 22. In any event, the preferred primary inputs are as represented in FIG. 4: (a) status of vehicle steering mode (i.e. two-wheel or four-wheel), (b) transmission gear position; and (c) vehicle speed.

Referring now to the start of the algorithm sequence, an initial decisional command is made to determine whether to disable rear wheel steering. As depicted, a decision tree is then entered to establish whether (a) the four-wheel mode is active, (b) the transmission is in neutral, or (c) the vehicle speed is less than a particular threshold, e.g. five miles per hour.

Only if and when all listed conditions are met is the operational system command accepted. Thus, only when all of these conditions are positively met will the rear wheel steering function be disabled, and the rear wheels then be centered to a non-angled or zero steer angle. A "no" answer to any one of the queries will return the algorithm sequence back to its initial decisional command position for a successive loop through the decision tree.

While this invention has been described in reference to illustrated embodiments, it will be understood that the scope of the present invention is not so limited. Various modifications of the illustrated embodiments may occur to those skilled in the art. It should also be understood that systems incorporating such modifications might fall within the scope of this invention, as defined by the appended claims.

The embodiments of the invention in which an exclusive property or privilege is claimed are defined as follows:

What is claimed is:

1. A steering control system includes an algorithm for disabling rear-wheel steering of a four-wheel steer vehicle with independently steerable sets of front and rear wheels wherein a rear wheel steering angle is a fractional proportion of a front wheel steering angle and is responsive to changes in the front wheel steering angle as a function of a vehicle speed, said vehicle including a motor and having at least one set of said wheels powered via said motor; said vehicle further including a transmission for effecting gear ratio changes between said motor and said powered wheels, said transmission including a user selectable neutral gear wherein upon selection of said neutral gear, said algorithm is activated for determining whether rear-wheel steering should be disabled.

2. The steering control system of claim 1 further comprising user selectability between single and dual steering modes, wherein said single mode defines a front wheel steering only mode, wherein said dual steering mode is defined by both sets of front and rear wheels being steerable, and further wherein said rear wheel steering response is disabled by said algorithm whenever a) the dual steering mode is selected, b) the vehicle is moving at a forward speed below a predetermined threshold speed, and c) the transmission of said vehicle is in said neutral gear.

3. The steering control system of claim 2, wherein when said rear wheel steering response is disabled, the rear wheels will return to a centered, non-angled, position.

4. The vehicle of claim 2 wherein said set of rear wheels are returned to a centered position via said algorithm only upon said selection of said neutral gear.

5. The steering control system of claim 1 further comprising user selectability between single and dual steering modes, and wherein said system is actuated via said algorithm only upon said selection of said neutral gear.

6. The steering control system of claim 2 wherein when said neutral gear is selected at speeds of less than five miles per hour, the steering control system automatically enters said single steering mode wherein said rear wheel steering response is disabled.

* * * * *